N. NILSON.
SCALE.
APPLICATION FILED JULY 30, 1908. RENEWED NOV. 28, 1910.

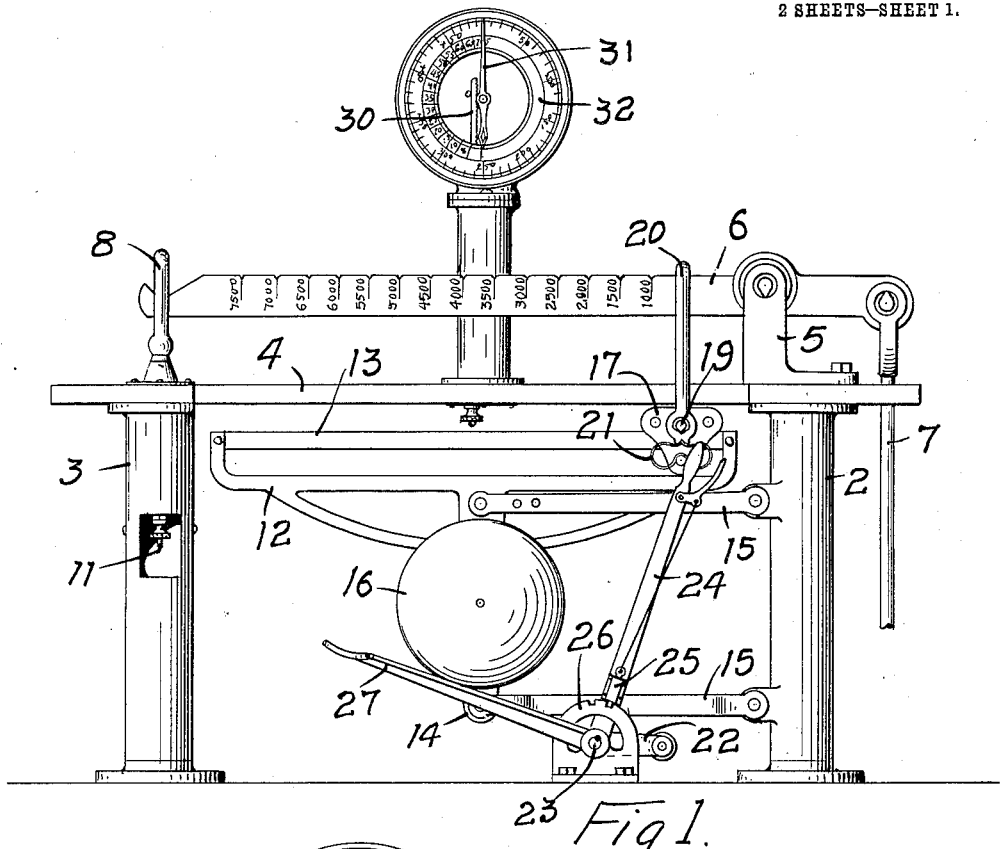
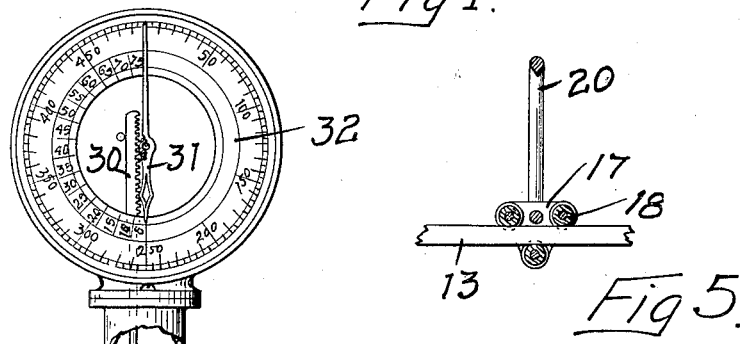
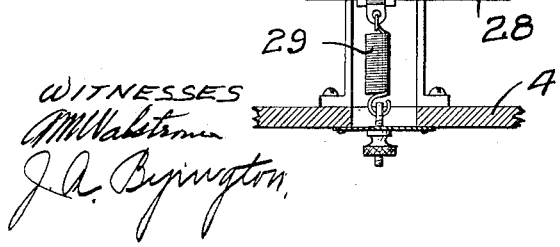

1,063,582.

Patented June 3, 1913.

2 SHEETS—SHEET 2.

WITNESSES

INVENTOR
NILS NILSON
BY
HIS ATTORNEYS

UNITED STATES PATENT OFFICE.

NILS NILSON, OF WAYZATA, MINNESOTA.

SCALE.

1,063,582.

Specification of Letters Patent.

Patented June 3, 1913.

Application filed July 30, 1908, Serial No. 446,091. Renewed November 28, 1910. Serial No. 594,601.

*To all whom it may concern:*

Be it known that I, NILS NILSON, of Wayzata, Hennepin county, Minnesota, have invented certain new and useful Improvements in Scales, of which the following is a specification.

My invention relates particularly to platform scales or those adapted for weighing heavy loads.

The object of the invention, is to provide means which will render it unnecessary to move the beam weight back and forth on the beam preparatory to ascertaining the weight of the load.

A further object, is to provide means which will permit the use of a very much heavier beam weight than is ordinarily employed, thereby shortening the leverage of the beam and causing it to be less effected by friction of the scale platform.

Other objects of the invention will appear from the following detailed description.

The invention consists generally in various constructions and combinations, all as hereinafter described, and particularly pointed out in the claims.

Figure 2:
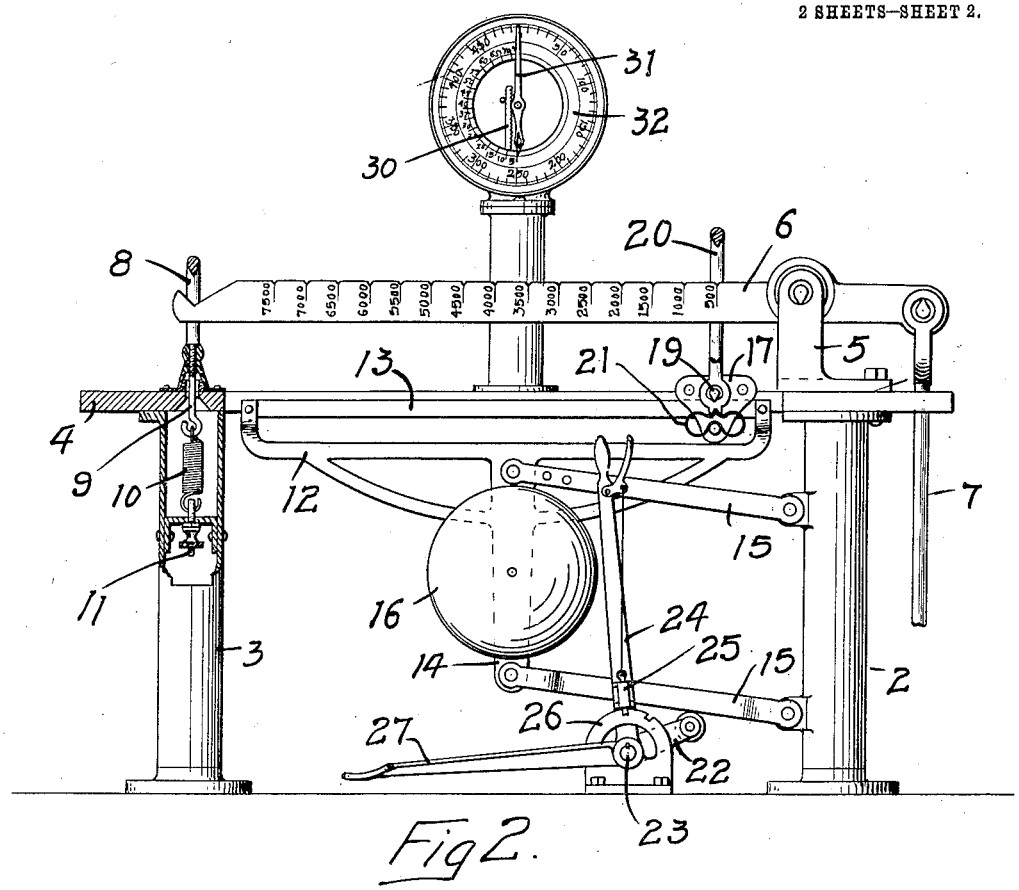
Figure 3:
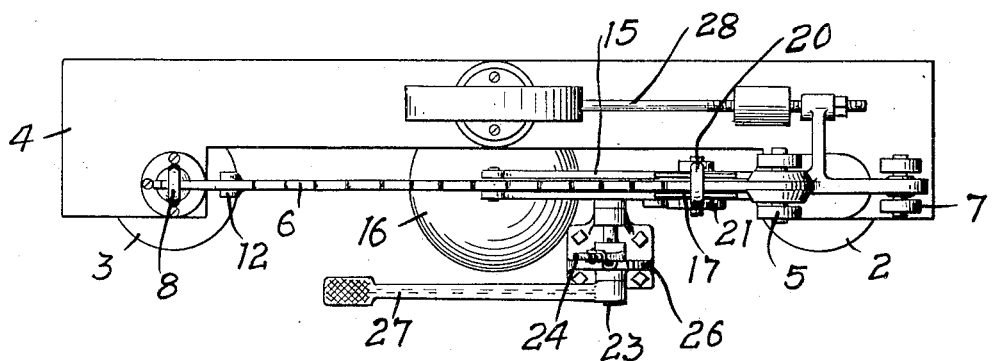

In the accompanying drawings forming part of this specification, Figure 1, is a front view of the scale embodying my invention, Fig. 2, is a similar view partially in section illustrating the weight in its raised inoperative position, Fig. 3, is a top view, Fig. 4, is a front view partially in section of the dial and indicator hand therefor, Fig. 5, is a detailed view illustrating the movable carriage by which the beam weight is suspended on the beam.

In the drawing, 2 and 3 represent upright standards supporting a plate 4 having brackets 5 whereon a scale beam 6 is pivoted. The short arm of this beam has a connection 7 leading to the scale platform not shown. The long arm of the beam is suitably graduated and a link 8 is provided at the end of the beam in the path of the same, and has a rod 9 extending down through the plate 4 and connected by a coiled spring 10 with an adjusting screw 11, by means of which suitable tension may be placed on the spring 10 to resist movement of the link 8. A yoke 12 has a bar 13 and is provided with a depending arm 14 connected by links 15 with the standard 2. The beam weight 16 is mounted on the arm 14 and may be of any suitable size. In a scale of the type shown, I prefer to employ a weight of some 300 lbs. and I am thus able to increase the leverage of the load, and counteract the effect of friction of the scale platform. A carriage 17 has antifriction rollers 18 on the bar 13, and is adapted to slide back and forth thereon and is provided with a knife edge pivot 19 to which a link 20 is pivotally connected and adapted to inclose the scale beam, being moved into or out of engagement with said beam according to the position of the bar 13 and the beam weight. The link is yieldingly held in an upright position, by means of a spring 21 mounted in said carriage. The normal inoperative position of the beam weight and its connections, is illustrated in Fig. 2. As shown in said figure, an arm 22 has an antifriction bearing on one of the links 15 and is mounted on a shaft 23. A lever 24 is secured on said shaft and has a latch 25 engaging the notches of a rack bar 26. A foot operated lever 27 is also mounted on the shaft 23 in position to be depressed for the purpose of raising the beam weight and lifting the link 20 out of engagement with the beam. The beam has a rod 28 supported thereon, the free end of said rod being connected with a spring 29 and with a rack bar 30 that is geared to an indicator hand 31 movable over the face of a dial 32, said dial having an inner and outer circle of graduations, one end of the indicator pointing to one circle and the other end to the other circle. In the operation of the scale, the load to be weighed is placed on the platform, and the beam weight being in the position shown in Fig. 2, the indicator hand will travel over the dial and around to the approximate weight of the load. The operator noting the position of the indicator hand, will then slide the carriage 17 along the bar 13 until the graduations on the beam indicated by the dial is reached. The yoke 12 will then be lowered by the movement of the lever 24, bringing the link 20 into engagement with the beam and allowing the beam weight to be wholly supported by the beam. I am thus able to bring the scale to a balance and accurately weigh the load on the platform without the necessity of lifting the beam weight and moving it back and forth on the beam. Furthermore, if the link 20 has been moved out on the beam at a distance from the pivot, it may be rendered inoperative by merely raising the yoke without the necessity of sliding the carriage toward the pivot of the beam. The link 20 will be raised when the beam weight is lifted regardless of its position on the beam; and when the indicator has pointed to the marks representing the approximate weight of the load, the carriage may be moved opposite the graduations representing that weight on the beam, and the link lowered into contact with the beam and the true weight obtained.

I claim as my invention:

1. The combination, with a scale beam, of a dial having graduations thereon and an indicator hand therefor, means operatively connecting said indicator hand with said beam, a comparatively heavy beam weight and support therefor, said support being capable of vertical movement with said weight, means preventing horizontal movement of said support, a carriage adapted to slide on said support and having a part to engage said beam, said carriage, when elevated out of engagement with said beam, being capable of movement lengthwise thereof without disturbing said weight, and means yieldingly resisting the movement of said connecting means.

2. In a scale, the combination, with a beam having graduations thereon, of a graduated dial and an indicator hand therefor, means operatively connecting said indicator hand with said beam, means yieldingly resisting the movement of said operating means, a pivoted yoke, a carriage adapted to slide thereon and having a link to engage said beam, a beam weight carried by said yoke and means for raising and lowering said yoke and carriage.

3. In a scale, the combination, with a scale beam, of a dial having graduations thereon and an indicator hand therefor, means operatively connecting said hand with said beam, means yieldingly resisting the movement of said operating means, a beam weight, means connecting said weight with said beam, means for raising or lowering said weight to render said connecting means operative or inoperative, said connecting means in its operative position being movable back and forth on said beam without moving said weight.

4. In a scale, the combination, with a scale beam, of a beam weight and yoke whereon said beam weight is supported, a carriage slidably mounted on said yoke and having a part to engage said beam, means for raising said yoke to relieve said carriage of the strain thereon and permit it to be moved lengthwise of said beam, and means preventing horizontal movement of said yoke.

5. In a scale, the combination, with a beam having graduations thereon, of a comparatively large beam weight and supporting means therefor, a carriage mounted on said supporting means and having a part to engage said beam and support said weight and its supporting means from said beam, said carriage being capable of movement back and forth over said beam independently of said weight and its support when said carriage is relieved of the strain thereon, substantially as described, and means preventing horizontal movement of said supporting means.

6. In a scale, the combination, with a beam having graduations and a stop for said beam under load, of a beam weight, a carrier for said weight means preventing longitudinal movement of said carrier, and means connecting said carrier with said beam and movable over the graduations of said beam between its pivot and said stop, said connecting means carrying the load of said weight and carrier.

7. In a scale, the combination, with a weighing beam having graduations thereon and a stop for said beam under load, of a beam weight, a carrier for said weight, means preventing longitudinal movement of said carrier, a link connecting said carrier with said beam and movable back and forth over the graduations of said beam between its pivot and said stop independently of said carrier and weight, said link carrying the load of said weight and carrier.

8. The combination, with a scale beam having graduations thereon and a stop for said beam under load and a platform connection, of a beam weight, a support therefor, means preventing longitudinal movement of said support, and means connecting said support and said beam and movable lengthwise on said beam over said graduations between the pivot of said beam and said stop, whereby the downward pull of said weight can be applied at any point on said beam without moving said weight horizontally, said connecting means carrying the load of said weight and support.

9. The combination, with a scale beam having graduations and platform connections and a stop for said beam under load, of a comparatively heavy beam weight, a support therefor, means preventing longitudinal movement of said support, means connecting said support with said beam and adapted to slide back and forth on said support and over the graduations of said beam and permitting the application of said weight to any of the graduations on said beam without movement of said weight lengthwise of said beam, said connecting means carrying the load of said weight and support.

10. The combination, with a scale beam having graduations and a stop for said beam under load, of a beam weight, a carrier therefor, means preventing longitudinal movement of said carrier, means connecting said carrier and said beam and movable lengthwise on said beam between its pivot and said stop, whereby the downward pull of said weight can be applied at any point on said beam, and means for lifting said carrier to relieve said beam of the load thereon.

11. A weighing scale comprising a pivoted beam having a short and long arm, the short arm having a platform connection, the long arm being graduated and having a stop for the beam under load, a beam weight, a carrier for said beam weight, means preventing longitudinal movement of said carrier, and means connecting said carrier with said beam and movable on said carrier over the graduations of said beam independently of said weight, said connecting means carrying the load of said weight and carrier.

12. A weighing scale comprising a graduated beam, a beam weight and carrier therefor, means permitting vertical oscillation of said carrier and holding it against horizontal movement, and means connecting said carrier with said scale beam and movable over the graduations of said beam.

13. In a scale, the combination, with a beam having graduations thereon, of a poise weight, a carrier for said weight and means slidable on said carrier and over the graduations of said beam, means preventing longitudinal movement of said carrier, said slidable means supporting the load of said weight and carrier.

In witness whereof, I have hereunto set my hand this 20th day of July 1908.

NILS NILSON.

Witnesses:
 RICHARD PAUL,
 J. A. BYINGTON.

---

Copies of this patent may be obtained for five cents each, by addressing the "Commissioner of Patents, Washington, D. C."